(12) United States Patent
Mohiuddin et al.

(10) Patent No.: US 11,410,009 B2
(45) Date of Patent: Aug. 9, 2022

(54) SYSTEMS AND METHODS FOR PROVIDING SMART ELECTRONIC LABELS AND TAGS

(71) Applicant: Sensormatic Electronics, LLC, Boca Raton, FL (US)

(72) Inventors: Mohammad Mohiuddin, Boynton Beach, FL (US); Melwyn F. Sequeira, Plantation, FL (US); Hubert A. Patterson, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 72 days.

(21) Appl. No.: 17/103,378

(22) Filed: Nov. 24, 2020

(65) Prior Publication Data

US 2021/0081738 A1    Mar. 18, 2021

Related U.S. Application Data

(62) Division of application No. 16/477,141, filed as application No. PCT/US2017/028361 on Apr. 19, 2017, now Pat. No. 10,878,301.

(60) Provisional application No. 62/446,309, filed on Jan. 13, 2017, provisional application No. 62/446,313, filed on Jan. 13, 2017.

(51) Int. Cl.
| | |
|---|---|
| G06K 19/07 | (2006.01) |
| G06K 7/10 | (2006.01) |
| G06Q 20/20 | (2012.01) |
| G06Q 20/32 | (2012.01) |
| G06Q 30/02 | (2012.01) |
| G07G 1/14 | (2006.01) |
| H04B 10/114 | (2013.01) |

(52) U.S. Cl.
CPC ..... *G06K 19/0707* (2013.01); *G06K 7/10366* (2013.01); *G06K 19/0704* (2013.01); *G06K 19/0712* (2013.01); *G06K 19/0723* (2013.01); *G06Q 20/201* (2013.01); *G06Q 20/3278* (2013.01); *G06Q 30/0283* (2013.01); *G07G 1/145* (2013.01); *H04B 10/114* (2013.01)

(58) Field of Classification Search
None
See application file for complete search history.

(56) References Cited

U.S. PATENT DOCUMENTS

| | | | | |
|---|---|---|---|---|
| 10,169,626 | B2* | 1/2019 | Britt | H04L 67/10 |
| 2014/0302833 | A1* | 10/2014 | Jin | H04W 4/16 |
| | | | | 455/417 |
| 2018/0249291 | A1* | 8/2018 | Shamim | H04W 4/023 |

* cited by examiner

*Primary Examiner* — Brent Swarthout
(74) *Attorney, Agent, or Firm* — ArentFox Schiff LLP

(57) ABSTRACT

Systems and methods for operating an Electronic Smart Tag ("EST"). The methods involve: operating the EST in a first operational state in which first item related information is output from an electronic output device of the EST that is powered by an energy storage device storing energy harvested from an external energy source; detecting when a charge level of the energy storage device reaches or falls below a first threshold level; and transitioning an operational state of the EST from the first operational state to a second operation state in which a message is output from EST requesting that a mobile device be placed in proximity to the EST for purposes of obtaining at least a first portion of the first item related information, in response to the detection that the charge level of the energy storage device has reached or fallen below the first threshold level.

10 Claims, 12 Drawing Sheets

SYSTEMS AND METHODS FOR PROVIDING SMART ELECTRONIC LABELS AND TAGS

CROSS-REFERENCE TO RELATED APPLICATIONS

This application is a Divisional Application of U.S. patent application Ser. No. 16/477,141, filed on Jul. 10, 2019, now U.S. Pat. No. 10,878,301, which is a U.S. National Phase entry of PCT Application No. PCT/US2017/028361 filed on Apr. 19, 2017, which claims priority to U.S. Provisional Patent Application No. 62/446,313 filed on Jan. 13, 2017 and U.S. Provisional Patent Application No. 62/446,309 filed on Jan. 13, 2017. The contents of the above patent applications are incorporated by reference in their entirety.

BACKGROUND

Statement of the Technical Field

The present disclosure concerns generally to labels and tags which display item related information (e.g., pricing information). More particularly, the present invention relates to implementing systems and methods for providing smart electronic labels and tags.

Description of the Related Art

Many of merchandise in a department store have a printed tag attached to them that displays information about the product (such as the item's price and/or description). Furthermore, the same pricing tag may have an EAS component embedded therein or attached thereto for theft prevention. Once a pricing tag is affixed to a product, the information on the pricing tag cannot be easily modified.

In some scenarios, price labels are used to display the price for a group of merchandise. The price labels are often paper-based labels affixed to the shelves on which the merchandise is disposed. Paper-based labels require the tedious and manually-intensive process of printing and applying new labels every time there is a price or product description update. This is a laborious and time-consuming process for store associates.

SUMMARY

The present invention concerns implementing systems and methods for operating an Electronic Smart Tag ("EST"). The methods comprise: operating the EST in a first operational state in which first item related information is output from an electronic output device of the EST that is powered by an energy storage device storing energy harvested from an external energy source; detecting when a charge level of the energy storage device reaches or falls below a first threshold level; and transitioning an operational state of the EST from the first operational state to a second operation state in which a message is output from EST requesting that a mobile device be placed in proximity to the EST for purposes of obtaining at least a first portion of the first item related information, in response to the detection that the charge level of the energy storage device has reached or fallen below the first threshold level. At least the first portion of the first item related information is communicated from the EST to the mobile device when placed in proximity thereto. The first item related information includes, but is not limited to, an item description, item nutritional information, a promotional message, an item regular price, an item sale price, a currency symbol, and/or a source of the item.

In some scenarios, the methods additionally or alternatively comprise: placing the EST in a third operational mode in which a display is turned off or inactive; detecting when a person comes in proximity with the EST; and transitioning the operational mode of the EST from the third operational mode to a fourth operational mode in which the display is turned on or active.

In those or other scenarios, the methods additionally or alternatively comprise: detecting, by a sensor disposed in the EST, when a person comes in proximity with the EST or when the EST is being moved; and performing operations by the EST to transmit a signal (e.g., and RF signal) including item related information specifying at least one characteristic of the item, in response to the detection that a person is in proximity with the EST or the detection that the EST is being moved. The characteristic includes, but is not limited to, an item description, item nutrition, an item regular price, an item sale price, a currency symbol, and/or an item source.

In those or other scenarios, the methods additionally or alternatively comprise: outputting from the EST item related information specifying at least one characteristic of the item; monitoring a charge level of an energy storage device disposed within the EST; performing first operations by the EST to obtain updated item related information from a remote computing device via a neighboring external device when the charge level of the energy storage device falls below a threshold level; and performing second operations by the EST to obtain the updated item related information from the remote computing device without the assistance of the neighboring external device when the charge level of the energy storage device is above the threshold level.

The first operations comprise: communicating from the EST a request message requesting that the neighboring external device obtain the updated item related information on the EST's behalf from the remote computing device; performing energy harvesting operations by the EST; and obtaining the updated item related information from the neighboring external device when the charge level of an energy storage device rises above the threshold level. The characteristic includes, but is not limited to, an item description, item nutrition, an item regular price, an item sale price, a currency symbol, and/or an item source.

An alarm message may be communicated from the EST to the remote computing device when the charge level of the energy storage device indicates that the EST is entering a depleted state. The remote computing device initiates an investigation as to why the EST is entering the depleted state, in response to a reception of the alarm message.

In those or other scenarios, the methods additionally or alternatively comprise: performing operations by an energy harvesting circuit of the EST to harvest energy from an external energy source; monitoring an output of the energy harvesting circuit; suppling power from a smart charger of the EST when the output indicates that the energy source is available at a level above a pre-defined level; and supplying power from an energy storage device of the EST that is storing energy harvested from the external energy source, when the output indicates that the external energy source has disappeared or dropped below a pre-defined level. An alarm message may be communicated from the EST to a remote computing device when the output indicates that the external energy source has disappeared or dropped below a pre-defined level. The remote computing device initiates an investigation as to why the external energy source has disappeared or dropped below a pre-defined level.

In those or other scenarios, the methods involve: detecting, by a sensor of the EST, an intensity level of solid state light in a surrounding environment; adjusting a sensitivity level of the sensor and a receiver of the EST if the intensity level of the solid state light falls between a first threshold level and a second lower threshold level; and/or transitioning an operational state of the EST from a first operational state in which LiFi technology is used for communications to a second operational state in which non-LiFi technology is used for communications, if the intensity level of solid state light is less than the second lower threshold level. Alerting operations of the EST may be disabled when the intensity level of the solid state light is between the first threshold level and the second lower threshold level. An alert may be output from the EST when the intensity level of solid state light falls below the second lower threshold level.

BRIEF DESCRIPTION OF THE DRAWINGS

Embodiments will be described with reference to the following drawing figures, in which like numerals represent like items throughout the figures.

DETAILED DESCRIPTION

Figure 1:
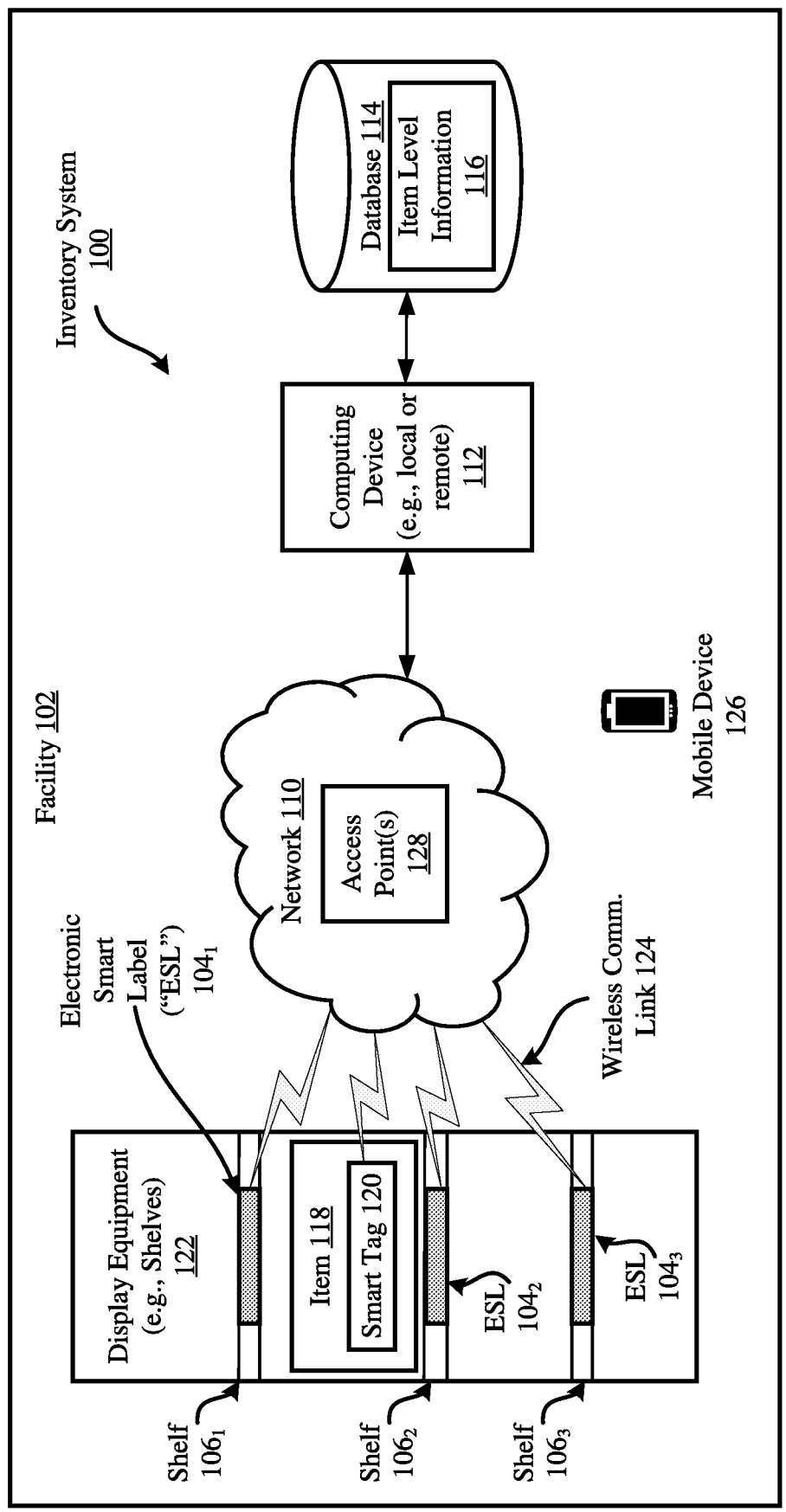
FIG. 1 is an illustration of an exemplary inventory system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Referring now to FIG. 1, there is provided an illustration of an exemplary inventory system 100. Inventory system 100 is entirely or at least partially disposed within a facility 102. The facility 102 can include, but is not limited to, a manufacturer's facility, a distribution center facility, a retail store facility or other facility within a supply chain.

As shown in FIG. 1, at least one item 118 resides within the facility 102. The item 118 has an EST 120 coupled thereto. This coupling is achieved via an adhesive (e.g., glue), a mechanical coupler (e.g., straps, clamps, snaps, etc.), a weld, chemical bond or other means. The EST 120 is generally configured to provide a visual and/or auditory output of item level information. The item level information includes, but is not limited to, an item description, item nutritional information, a promotional message, an item regular price, an item sale price, a currency symbol, and/or a source of the item. The EST 120 will be described in detail below in relation to FIGS. 2-4. The item level information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selection parameter.

The item 118 is disposed on display equipment 122. The display equipment includes, but is not limited to, shelves $106_1$-$106_3$, display cabinets, and/or exhibit cases. In the shelf scenario, each shelf $106_1$-$106_3$ may have an Electronic Smart Label ("ESL") affixed thereto. ESLs are well known in the art, and therefore will not be described herein. Still, it should be understood that the ESLs display information relating to the items stored on the respective shelves. In some scenarios, the ESLs are connected to a corporate network via long-range radio technology. In this case, the ESLs may communicate with the ESTs via a short-range or long-range radio and provide informational updates thereto.

The EST 120 and ESLss $104_1$-$104_3$ comprise wireless communication components that enable the communication of item level information thereto and/or therefrom. The wireless communication components can implement one or more different types of communication technology. The communication technologies can include, but are not limited to, Radio Frequency ("RF") communication technology; Bluetooth technology; WiFi technology; beacon technology; and/or LiFi technology. Each of the listed types of communication technology are well known in the art, and therefore will not be described herein.

The item level information is provided to the EST and ESLs from a computing device 112 via a network 110. The computing device 112 can be local to the facility 102 as shown in FIG. 1 or remote from the facility 102. The computing device 112 will be described in detail below in relation to FIG. 5. However, at this time, it should be understood that the computing device 112 is configured to: write data to and read data from a database 114, EST 120 and/or ESLs $104_1$-$104_3$; and/or perform language and currency conversion operations using item level information obtained from the database 114, EST 120 and/or ESLs $104_1$-$104_3$. The data can include, but is not limited to, item level information 116.

Accordingly, the computing device 112 facilitates updates to the item level information output from the ESTs and ESLs. Such information updating can be performed periodically, in response to instructions received from an associate (e.g., a retail store employee), and/or in response to a detected change in the item level information 116. For example, if a certain product is placed on sale, then the sale price for that product is transmitted to access point 128, which in turn transmits the sale price to each EST/ESL associated with that product. The sale price is then output from the ESTs/ESLs. The present solution is not limited to the particulars of this example.

The network 110 interconnects the computing device 112 with at least one access point 128. Network 110 can be a wired or wireless network facilitating communication between computing device 112 and the access point 128. The access point 128 receives the item level information 116 from the computing device 112, optionally translates this information, and sends it to the EST 120 and/or ESLs $104_1$-$104_3$ via wireless communication links 124.

Although a single computing device 112 is shown in FIG. 1, the present solution is not limited in this regard. It is contemplated that more than one computing device can be implemented. Also, the present solution is not limited to the exemplary inventory system architecture described in relation to FIG. 1. For example in other scenarios, the present solution is used in a system such as that disclosed in U.S. Patent Publication No. 2012/0326849 to Relihan et al. (incorporated herein by reference).

Figure 2:
FIG. 2 is an illustration of an exemplary Electronic Smart Tag ("EST").

Referring now to FIG. 2, there is an illustration of an exemplary EST 200 displaying item level information. An exemplary architecture for the EST 200 is provided in FIGS. 3-4. EST 120 and/or ESLs $104_1$-$104_3$ of FIG. 1 is/are the same as or substantially similar to EST 200. As such, the discussion of EST 200 is sufficient for understanding the EST 120 and/or ESLs $104_1$-$104_3$ of FIG. 1.

Figure 3:
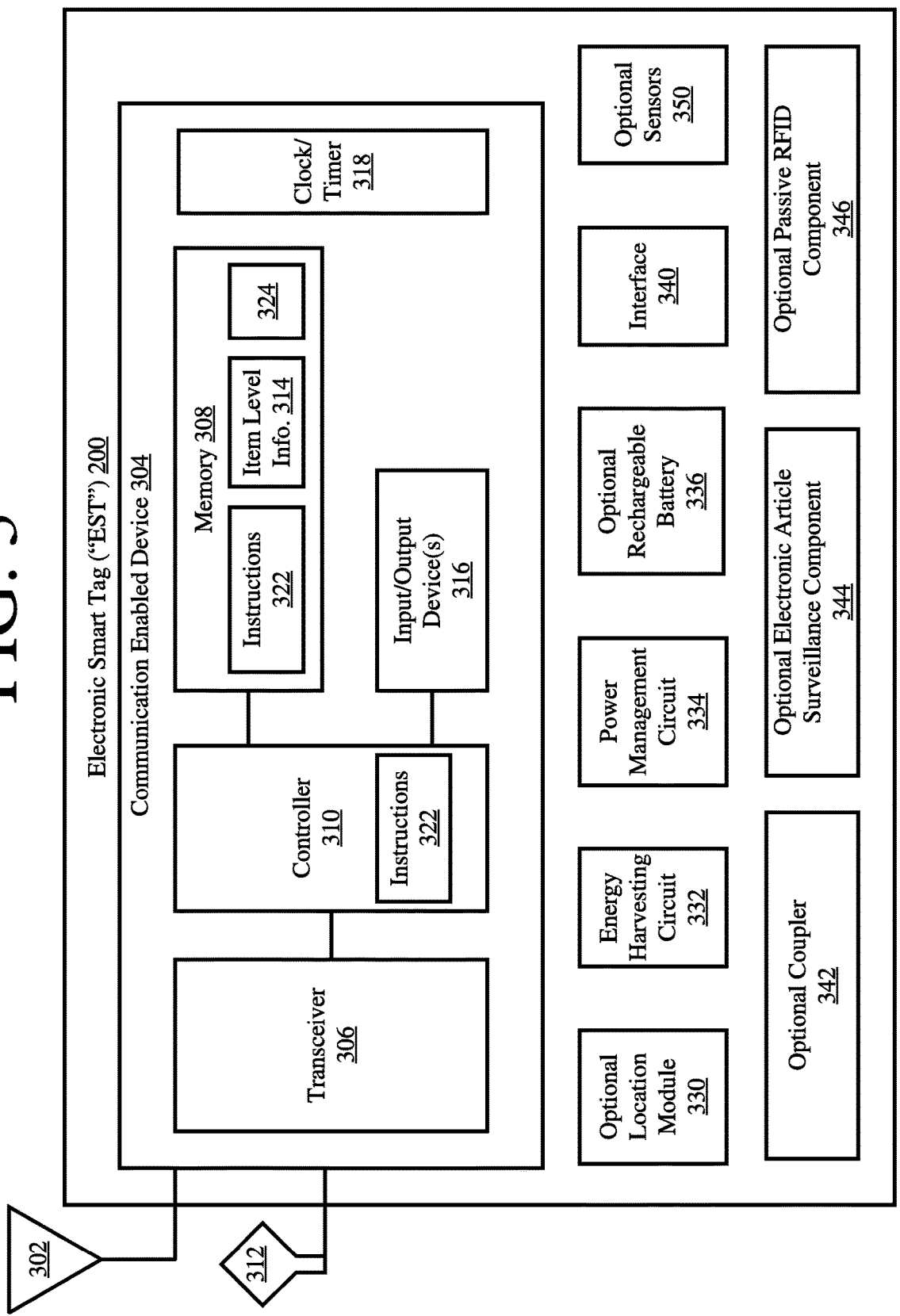
FIG. 3 is a block diagram of an exemplary architecture for the EST of FIG. 2.

The EST 200 can include more or less components than that shown in FIG. 3. However, the components shown are sufficient to disclose an illustrative embodiment implementing the present solution. Some or all of the components of the EST 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative EST 200 configured to facilitate improved inventory pricing management. In this regard, the EST 200 is configured for allowing data to be exchanged with an external device (e.g., computing device 112 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is) are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 306-318 shown in FIG. 3 may be collectively referred to herein as a communication enabled device 304, and include a memory 308 and a clock/timer 318. Memory 308 may be a volatile memory and/or a non-volatile memory. For example, the memory 308 can include, but is not limited to, Random Access Memory ("RAM"), Dynamic RAM ("DRAM"), Static RAM ("SRAM"), Read Only Memory ("ROM") and flash memory. The memory 308 may also comprise unsecure memory and/or secure memory.

In some scenarios, the communication enabled device 304 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 308. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed EST 200. The update of the firmware, in case of issues, can also be performed remotely.

As shown in FIG. 3, the communication enabled device 304 comprises at least one antenna 302, 312 for allowing data to be exchanged with the external device via a wireless communication technology (e.g., an RFID technology, an NFC technology and/or a SRC technology). The antenna 302, 312 is configured to receive signals from the external device and/or transmit signals generated by the communication enabled device 304. In some scenarios, the antenna 302, 312 comprises a near-field or far-field antenna. The antennas includes, but are not limited to, a chip antenna or a loop antenna.

The communication enabled device 304 also comprises a transceiver 306. Transceivers are well known in the art, and therefore will not be described herein. However, it should be understood that the transceiver 306 generates and transmits signals (e.g., RF carrier signals) to external devices, as well as receives signals (e.g., RF signals) transmitted from external devices. In this way, the communication enabled device 304 facilitates the registration, identification, location and/or tracking of an item (e.g., item 118 of FIG. 1) to which the EST 200 is coupled. The communication enabled device 304 also facilitates the automatic and dynamic modification of item level information that is being or is to be output from the EST 200 in response to certain trigger events. The trigger events can include, but are not limited to, the EST's arrival at a particular facility (e.g., facility 102 of FIG. 1), the EST's arrival in a particular country or geographic region, a date occurrence, a time occurrence, a price change, and/or the reception of user instructions.

Item level information 314 and/or other information 324 associated with the identification and/or location of the EST 200 can be stored in memory 308 of the communication enabled device 304 and/or communicated to other external devices (e.g., computing device 112 of FIG. 1) via transceiver 306 and/or interface 340 (e.g., an Internet Protocol or cellular network interface). For example, the communication enabled device 304 can communicate information specifying a timestamp, a unique identifier, item description, item price, a currency symbol and/or location information to an external computing device. The external computing device (e.g., server) can then store the information in a database (e.g., database 114 of FIG. 1) and/or use the information during language and/or currency conversion operations.

The communication enabled device 304 also comprises a controller 310 and input/output devices 316. The controller 310 can also execute instructions 322 implementing methods for facilitating the management of item pricing. In this regard, the controller 310 includes a processor (or logic circuitry that responds to instructions) and the memory 308 includes a computer-readable storage medium on which is stored one or more sets of instructions 322 (e.g., software code) configured to implement one or more of the methodologies, procedures, or functions described herein. The instructions 322 can also reside, completely or at least partially, within the controller 310 during execution thereof by the EST 200. The memory 308 and the controller 310 also can constitute machine-readable media. The term "machine-readable media", as used here, refers to a single medium or multiple media (e.g., a centralized or distributed database, and/or associated caches and servers) that store the one or more sets of instructions 322. The term "machine-readable media", as used here, also refers to any medium that is capable of storing, encoding or carrying a set of instructions 322 for execution by the EST 200 and that cause the EST 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the EST 200 and/or for notifying the person of a particular pricing status (e.g., on sale status) of the item to which the EST is coupled.

The clock/timer 318 is configured to determine a date, a time, and/or an expiration of a pre-defined period of time. Technique for determining these listed items are well known in the art, and therefore will not be described herein. Any known or to be known technique for determining these listed items can be used herein without limitation.

The EST 200 also comprises an optional location module 330. The location module 330 is generally configured to determine the geographic location of the EST at any given time. For example, in some scenarios, the location module 330 employs Global Positioning System ("GPS") technology and/or Internet based local time acquisition technology. The present solution is not limited to the particulars of this example. Any known or to be known technique for determining a geographic location can be used herein without limitation.

The optional coupler 342 is provided to securely or removably couple the EST 200 to an item (e.g., item 118 of FIG. 1). The coupler 342 includes, but is not limited to, a mechanical coupling means (e.g., a strap, clip, clamp, snap) and/or adhesive (e.g., glue or sticker). The coupler 342 is optional since the coupling can be achieved via a weld and/or chemical bond.

The EST 200 can also include an optional rechargeable battery 336, an optional Electronic Article Surveillance ("EAS") component 344, and/or an operational passive/active/semi-passive RFID component 346. Each of the listed optional components 336, 344, 346 is well known in the art, and therefore will not be described herein. Any known or to be known battery, EAS component and/or RFID component can be used herein without limitation.

As shown in FIG. 2, the EST 200 further comprises an energy harvesting circuit 332 and a power management circuit 334 for ensuring continuous operation of the EST 200 without the need to change a battery. In some scenarios, the energy harvesting circuit 302 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy.

The energy harvesting circuit 332 can operate in two (2) ways. First, the energy harvesting circuit 332 can harvest energy from an available source while online (i.e., when the EST 200 is attached to merchandise). Second, the energy harvesting circuit 332 can harvest energy while offline (i.e., when the EST 200 is detached from merchandise) via a charging station/bin. This ensures that the EST 200 is fully charged when the EST is ready to be deployed or go online.

The energy harvesting circuit 332 can also be supplemented with bigger harvesters and/or a mains power source. In this case, the energy harvesting circuit 332 can be placed closer to its primary source (e.g., a solar panel on top of a shelf) and power from there can be distributed over two (2) wires. The design allows multiple labels to be connected to a single harvester circuit. The harvester circuit can be replaces with the mains power source.

The EST 200 may also include optional sensors 350 employing proximity sensing technology. The sensors 350 can include, but are not limited to, an IR detector, a camera, and/or an RF detection unit. The input/output devices 316 (e.g., the display) can be turned off when a person is not located in proximity thereto. This capability is useful when the input/output devices 316 (e.g., the display) is not considered low power.

The power management circuit 334 is generally configured to control the supply of power to components of the EST 200. In the event all of the storage and harvesting resources deplete to a point where the EST 200 is about to enter a shutdown/brownout state, the power management circuit 334 can cause an alert to be sent from the EST 200 to a remote device (e.g., computing device 112 of FIG. 1). In response to the alert, the remote device can inform an associate (e.g., a store employee) so that (s)he can investigate why the EST 200 is not recharging and/or holding charge.

The power management circuit 334 is also capable of redirecting an energy source to the EST's 200 electronics based on the energy source's status. For example, if harvested energy is sufficient to run the EST's 200 function, the power management circuit 334 confirms that all of the EST's 200 storage sources are fully charged such that the EST's 200 electronic components can be run directly from the harvested energy. This ensures that the EST 200 always has stored energy in case harvesting source(s) disappear or lesser energy is harvested for reasons such as drop in RF, light or vibration power levels. If a sudden drop in any of the energy sources is detected, the power management circuit 334 can cause an alert condition to be sent from the EST 200 to the remote device (e.g., computing device 112 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

Figure 4:
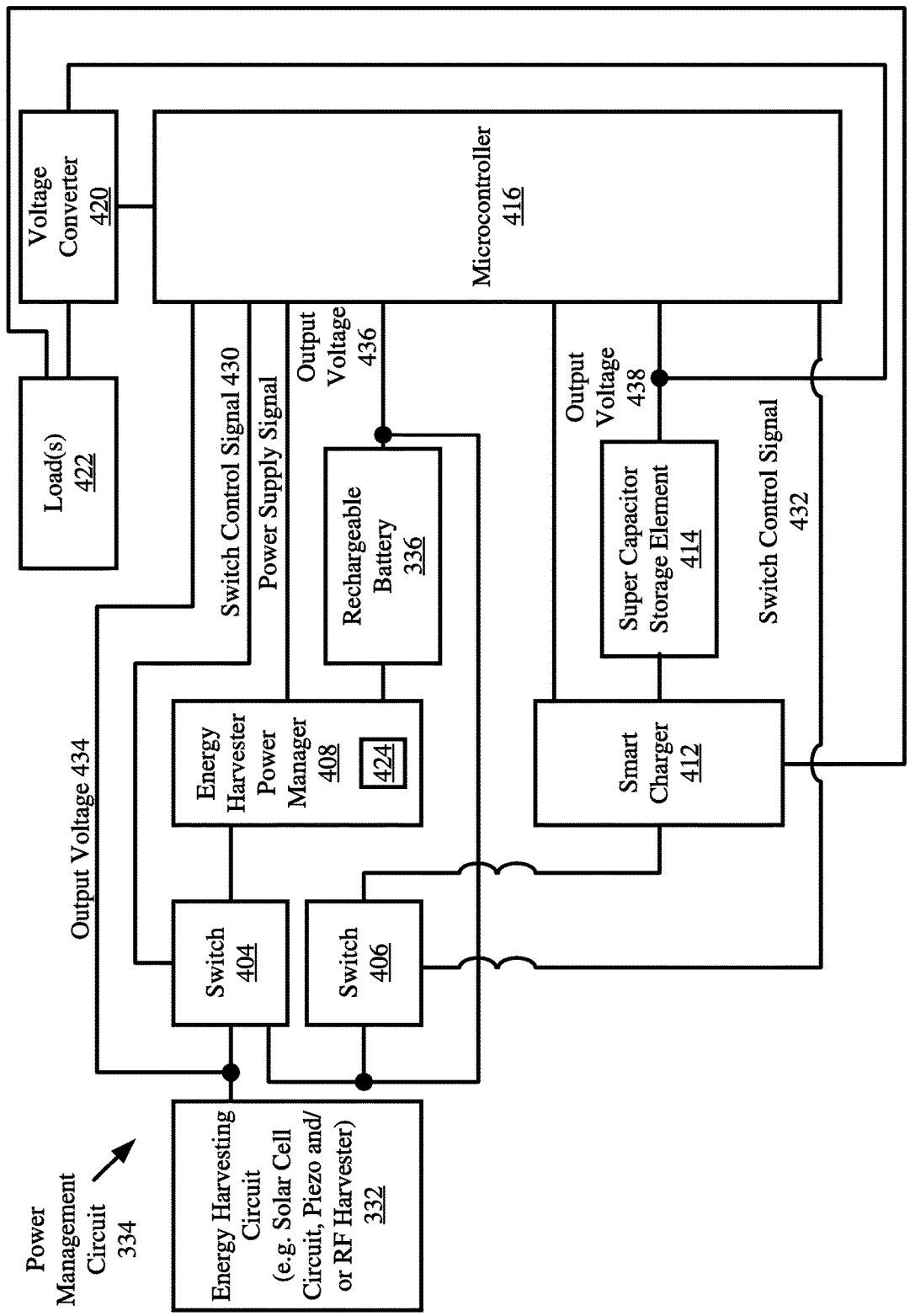
FIG. 4 is a block diagram of an exemplary architecture for a power management circuit of the EST of FIGS. 2-3.

Referring now to FIG. 4, there is provided a block diagram of an exemplary architecture 400 for the power management circuit 334 of the EST 200. The power management circuit 334 is not limited to the particular architecture shown in FIG. 4. In this regard, it should be understood that that power management circuit 334 can include more or less components than that shown in FIG. 4.

The power management circuit 334 is configured to provide a way in which the EST 200 is: deployable as a plug-n-play energy harvested wireless sensor that is ready to function as soon as it is turned on; and a self-sustaining sensor system wherein its power source would virtually never need to be replaced. In this regard, the power management circuit 334 is electrically connected to the energy harvesting circuit 332 and the optional rechargeable battery 336. The power management circuit 334 comprises switches 404, 406, an Energy Harvester Power Manager ("EHPM") 408, a Super Capacitor ("SC") storage element 414, a smart charger 412 for the SC storage element, a microcontroller 416, and a DC-DC voltage converter 420 electrically connected to a load(s) 422. The microcontroller 416 can be the same as or separate/distinct from the controller 310 of FIG. 3. The load 422 can include, but is not limited to, components 304, 330, 340, 350, 344 and/or 346 of FIG. 3.

In some scenarios, the energy harvesting circuit 332 comprises a solar cell circuit. The present invention is not limited in this regard. Other types of energy harvesting circuits can be used herein that generate a relatively low amount of output power.

At initial power up of the EST 200, the SC storage element 414 is assumed to be in a completely discharged state. Thus, the initial charge of the SC storage element 414 is at a level of approximately or substantially equal to zero volts. However, the rechargeable battery 336 is in a quasi-discharged state in which its initial charge is at a level greater than zero volts (e.g., 3 volts). As such, the rechargeable battery 336 has a sufficient amount of initial stored energy to nearly instantaneously enable operations of the control electronics of the EST 200. In this regard, an output voltage 436 is supplied from the rechargeable battery 336 to the EHPM 408 via switch 404, whereby operations of boost converters 424 contained in the EHPM 408 are started immediately after turning on the EST 200. The output voltage 436 is also supplied from the rechargeable battery 336 to the microcontroller 416 via the EHPM 408.

The available power from rechargeable battery is also used at this time to charge the SC storage element 414. In this regard, the output voltage 436 of the rechargeable battery 336 is supplied to the SC storage element 414 via switch 406 and smart charger 412, whereby charging of the SC storage element is expedited. An output voltage 438 of the SC storage element is supplied to the load(s) 422 via the voltage converter 420. The EST 200 is considered fully operational when the output voltage 438 reaches a level (e.g., 3.8 V) that is sufficient to cause the load(s) to perform the intended operations thereof.

Throughout operation of the EST 200, the microcontroller 416 monitors the output voltage 434 of the solar cell circuit 402, as well as the output voltage 436 of the rechargeable battery and the output voltage 438 of the SC storage element 414. Once the output voltage 438 of the SC storage element 414 reaches a desired voltage (e.g., 3.8 V) after system activation (or powering on), the microcontroller 416 enables a timer to time the charging of the SC storage element 414. After a pre-determined time period (e.g., 6 hours), an assumption is made that the SC storage element 414 has reached its leakage current equilibrium, and therefore no longer needs to be charged. In effect, the microcontroller 416 may optionally perform operations at this time to terminate the supply of output voltage 436 to the SC storage element 414 via switch 406 and smart charger 412.

When the output voltage 438 of the SC storage element 414 falls below a threshold value (e.g., 3.3 V), the microcontroller 416 communicates a switch control signal 432 to switch 406 so as cause the output voltage 436 of the rechargeable battery 410 to once again be supplied to the SC storage element 414 via the smart charger 412. Output voltage 436 is supplied to the SC storage element 414 until the output voltage 438 thereof exceeds an upper threshold value. In effect, the SC storage element 414 is recharged whereby the energy expended while driving load(s) 422 is(are) restored.

When the solar cell circuit 402 is active, the output voltage 434 of the solar cell circuit 402 is supplied to the rechargeable battery 336 via EHPM 408. In effect, the rechargeable battery 336 is recharged by the solar cell circuit 402, whereby the energy expended in charging and recharging the SC storage element 414 is restored while the EST 200 is maintained in its fully operational state.

The above described process of using the rechargeable battery 336 to charge the SC storage element 414 is repeated as needed. Thus, the above described EST 200 performs self-monitoring and charges its respective re-chargeable elements throughout its entire operation.

Figure 5:
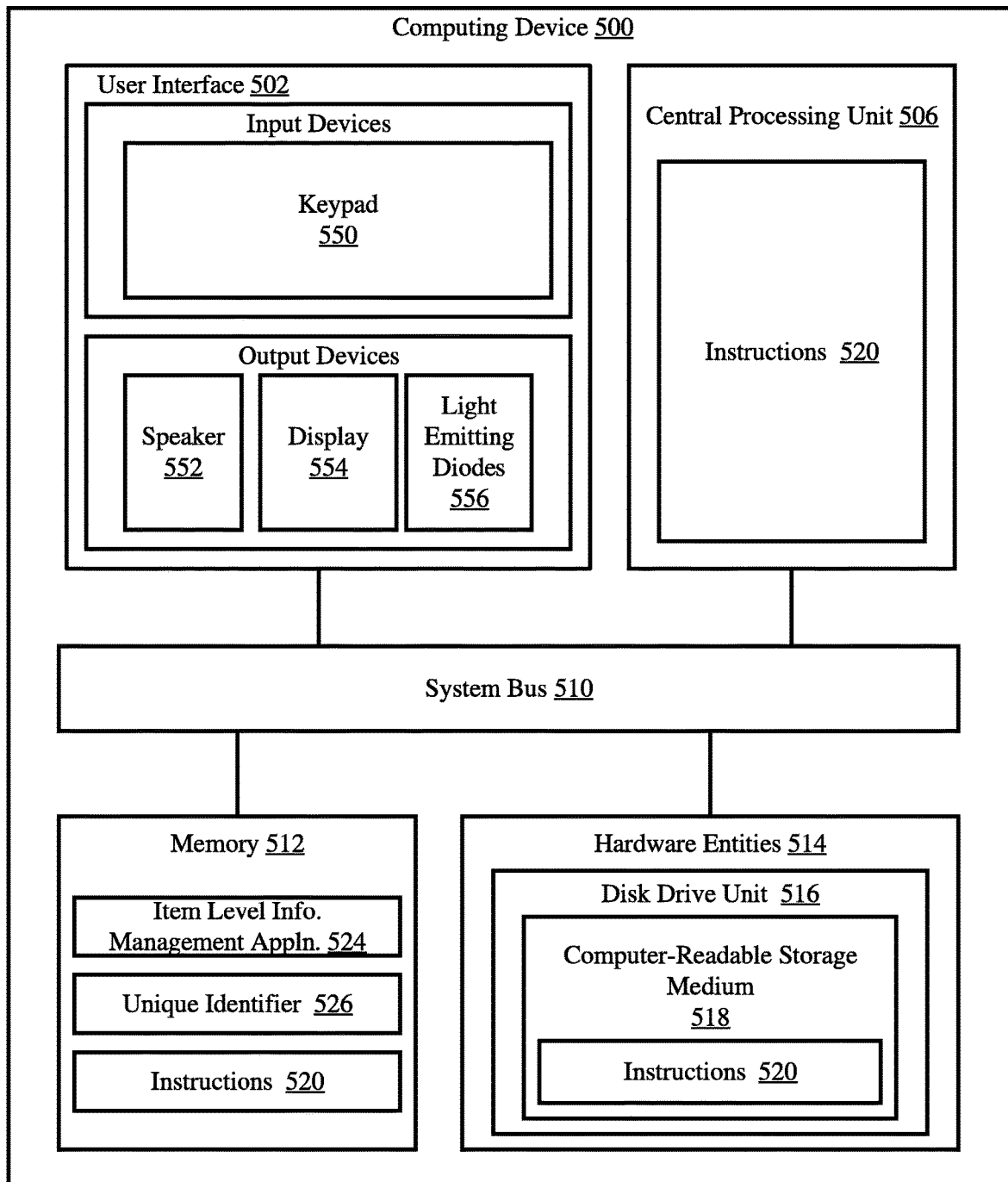
FIG. 5 is a block diagram of an exemplary architecture for a computing device.

Referring now to FIG. 5, there is provided a detailed block diagram of an exemplary architecture for a computing device 500. Computing device 112 of FIG. 1 is the same as or substantially similar to computing device 500. As such, the following discussion of computing device 500 is sufficient for understanding computing device 112.

Computing device 500 may include more or less components than those shown in FIG. 5. However, the components shown are sufficient to disclose an illustrative embodiment implementing the present solution. The hardware architecture of FIG. 5 represents one embodiment of a representative Computing device configured to facilitate improved inventory pricing management. As such, the computing device 500 of FIG. 5 implements at least a portion of a method for automatically and dynamically modifying item level information output from ESTs and/or ESLs in accordance with the present solution.

Some or all the components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the computing device 500.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 320 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 320 for execution by the computing device 500 and that cause the computing device 500 to perform any one or more of the methodologies of the present disclosure.

In some scenarios, the hardware entities 514 include an electronic circuit (e.g., a processor) programmed for facilitating the provision of item level information in a language and currency used in a given geographic location whereat or wherein an EST or ESL resides. In this regard, it should be understood that the electronic circuit can access and run an item level information management application 524 installed on the computing device 500. The software application 524 is generally operative to: obtain item level information and/or other information from ESTs and/or ESLs; program item level information onto ESTs and/or ESLs; convert the language, pricing and/or currency symbol of item level information; and/or facilitate registration of ESTs and/or ESLs with inventory systems. Other functions of the software application 524 will become apparent as the discussion progresses.

Referring now to FIG. 6, there is provided a flow diagram of an exemplary method 600 for operating an EST (e.g. EST 120 of FIG. 1 and/or EST 200 of FIGS. 2-4). Notably, method 600 can be implemented via an ESL instead of or in addition to an EST. A person skilled in the art would appreciate that certain modifications to method 600 would need to be made in this scenario.

Figure 6A:
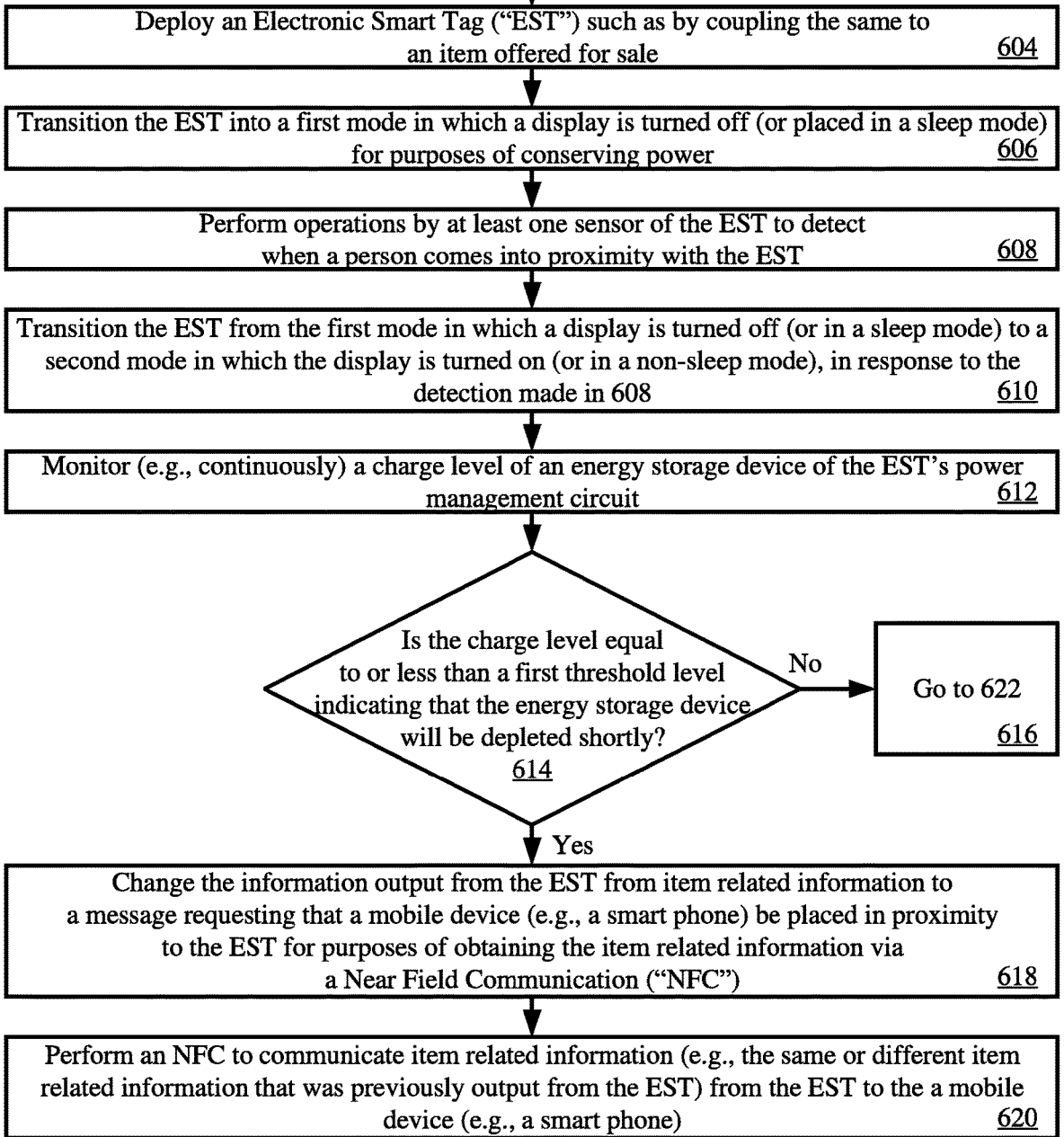
FIGS. 6A-6B (collectively referred to herein as "FIG. 6") provide a flow diagram of an exemplary method for operating an EST.

As shown in FIG. 6A, method 600 begins with 602 and continues with 604 where the EST is deployed. In some scenarios, the EST is deployed by coupling it to an item (e.g., a piece of merchandise), programming it to display certain item related information (e.g., a price and/or product description), and placing the item/EST on display equipment (e.g., display equipment 122 of FIG. 1). Next in 606, the EST is transitioned into a first mode in which a display (e.g., display 316 of FIG. 3) is turned off (or placed in a sleep mode) for purposes of conserving power.

Thereafter, at least one sensor (e.g., sensor 350 of FIG. 3) of the EST performs operations in 608 to detect when a person comes into proximity with the EST. Sensor based techniques for detecting when a person or object comes in proximity to another person or object are well known in the art. Any known or to be known sensor based technique can be used herein without limitation. In response to the detection of 608, the EST transitions from the first mode in which the display is turned off (or in a sleep mode) to a second mode in which the display is turned on (or in a non-sleep mode), as shown by 610.

While the EST is in use, it may monitor a charge level of an energy storage device (e.g., super capacitor storage element 414 of FIG. 4) disposed therein. This monitoring can be performed continuously as shown by 612 or periodically (not shown) by a processor of the EST (e.g., microcontroller 416 of FIG. 4). If the charge level is greater than a first threshold level [614:NO], then 616 is performed where method 600 goes to 622 of FIG. 6B. 622 will be discussed below. If the charge level is equal to or less than a first threshold level [614:YES], then 618 is performed where the information output (e.g., visually or auditorily output) from the EST is changed (e.g., by controller 310 of FIG. 3) from item related information (e.g., item related information 314 of FIG. 1) to a message requesting that a mobile device (e.g., mobile device 126 of FIG. 1) be placed in proximity to the EST for purposes of obtaining item related information via an NFC. Alternatively or additionally, instructions are provided to connect to a network (e.g., a retail store network) via a particular communications technology (e.g., WiFi, BLE, LiFi, etc.) to obtain information. When the mobile device is placed in proximity to the EST, the NFC is performed in 620 (e.g., by the communication enabled device 304 of FIG. 3) whereby item related information is communicated from the EST to the mobile device. The communicated item related information can include at least a portion of the same item related information which was previously output from the EST and/or different item related information from that which was previously output from the EST. Upon completing 620, method 600 continues with 622 of FIG. 6B.

Figure 6B:
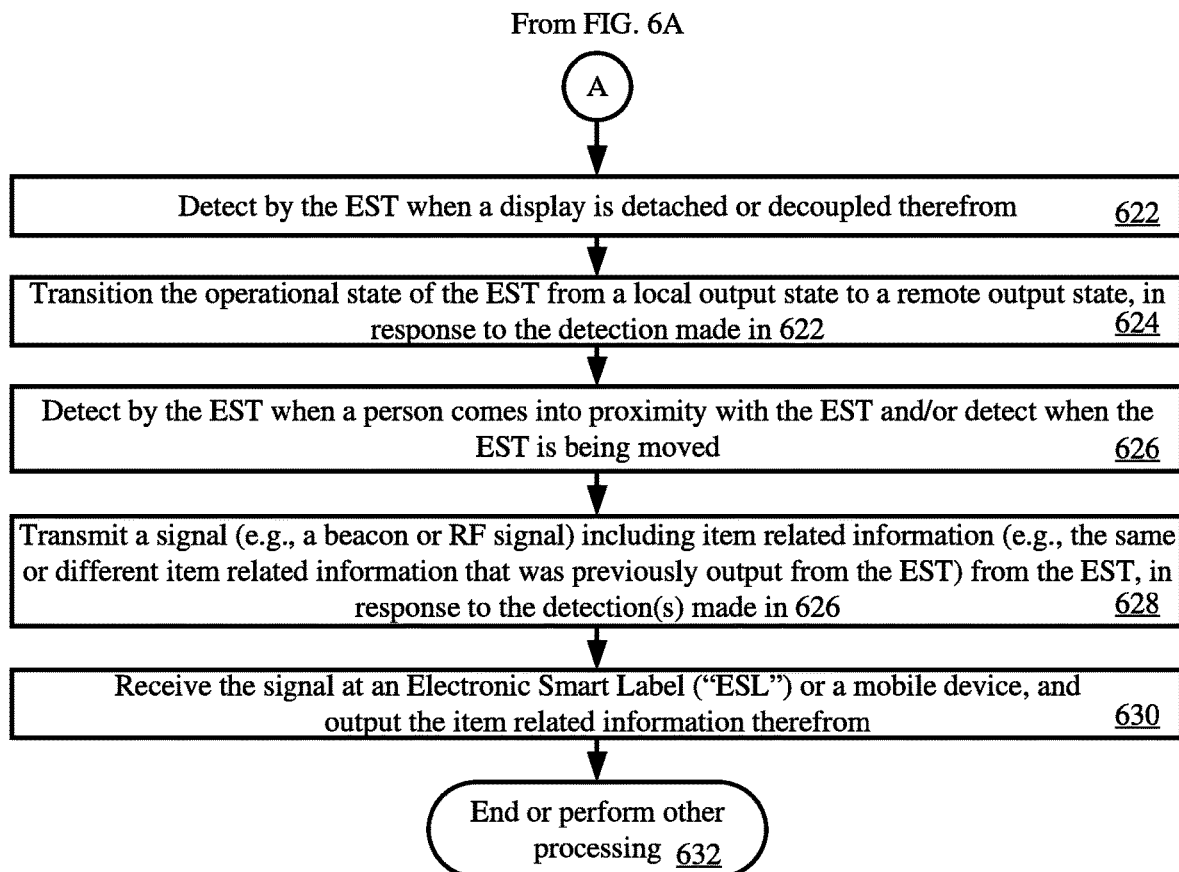

As shown in FIG. 6B, 622 involves detecting by the EST when the display (e.g., display 316 of FIG. 3) is detached or decoupled therefrom. Techniques for detecting when an electronic component has been coupled or decoupled from a system are well known in the art, and therefore will not be described herein. Any known or to be known technique for detecting when an electronic component has been coupled or decoupled can be used herein without limitation.

In response to the detection of 622, 624 is performed where the operational state of the EST is transitioned from a local output state (i.e., a state in which the item related information is output from an output device of the EST) to a remote output state (i.e., a state in which the item related information is output from an output device remote from the EST, such as a display of the mobile device). This operational state transition can be performed by a processor (e.g., controller 310 of FIG. 3) of the EST.

Subsequently in 626, the EST detects when a person comes in proximity with the EST and/or detects when the EST is being moved. This detection can be achieved using sensors (e.g., sensors 350 of FIG. 3) of the EST. Sensor based techniques for detecting when a person comes in proximity to an object and/or when an object is being moved are well known in the art, and therefore will not be described herein. Any known or to be known sensor based technique can be used herein without limitation. In response to the detection(s) of 626, 628 is performed where the EST transmits a signal (e.g., a beacon or RF signal) including item related information (e.g., all or a portion of the same or different item related information that was previously output from the EST). This transmission is achieved using a communication enabled device of the EST (e.g., a communication enabled device 304 of FIG. 3). The transmitted signal is received by an external device and output therefrom, as shown by 630. The external device can include, but is not limited to, an ESL (e.g., ESL 104$_1$, 104$_2$, or 104$_3$ of FIG. 1) and/or a mobile device (e.g., mobile device 126 of FIG. 1). Thereafter, 632 is performed where method 600 ends or other processing is performed.

Referring now to FIG. 7, there is provided another exemplary method 700 for operating an EST (e.g. EST 120 of FIG. 1 and/or EST 200 of FIGS. 2-4). Notably, method 700 can be implemented via an ESL instead of or in addition to an EST. A person skilled in the art would appreciate that certain modifications to method 700 would need to be made in this scenario.

Figure 7A:
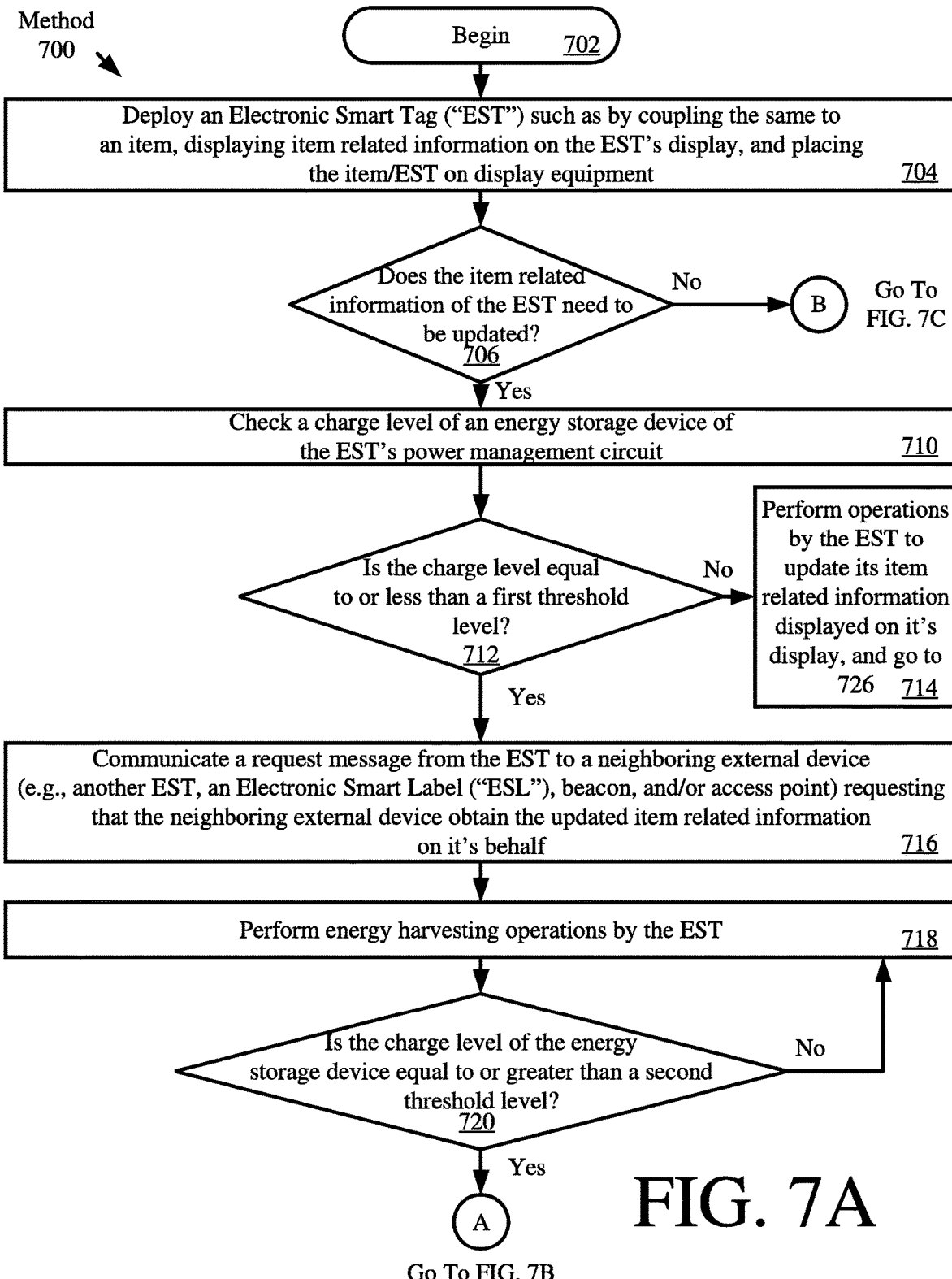
FIGS. 7A-7D (collectively referred to herein as "FIG. 7") provide a flow diagram of another exemplary method for operating an EST.
Figure 7B:
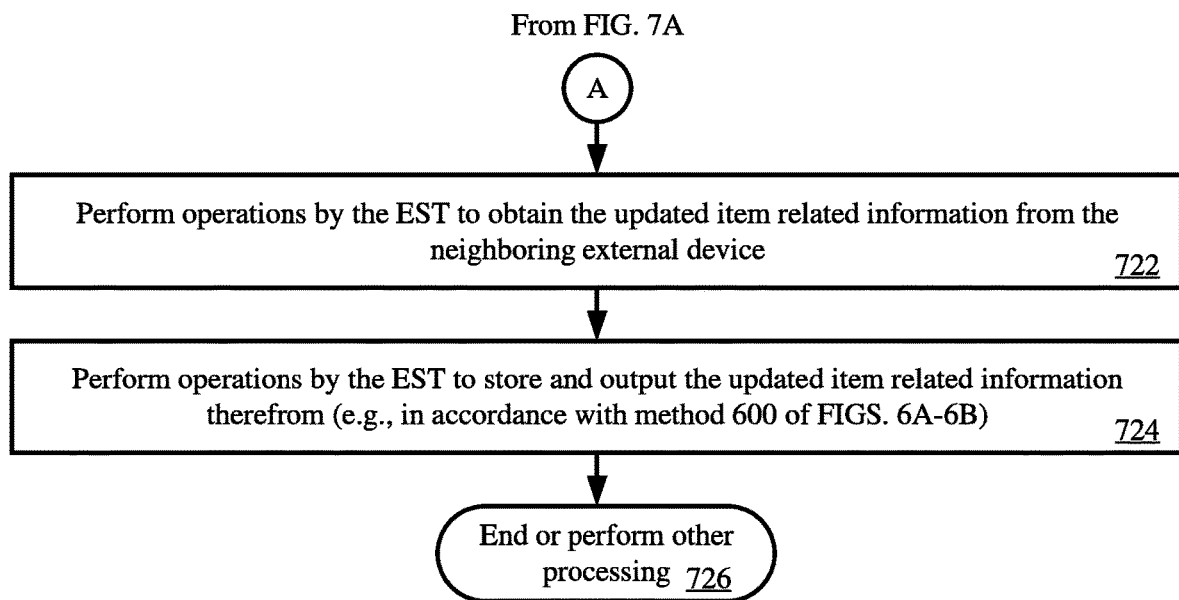

As shown in FIG. 7A, method 700 begins with 702 and continues with 704 where the EST is deployed. In some scenarios, the EST is deployed by coupling the same to an item (e.g., a piece of clothing or merchandise packaging), displaying item related information on the EST's display, and placing the item/EST on display equipment. Next, a decision is made as to whether the item related information needs to be updated. This decision can be achieved by communicating an update request from a remote computing device (e.g., remote computing device 112 of FIG. 1) to the EST. Alternatively or additionally, this decision can be made by the EST based on an expiration of a time period (e.g., detected using the clock/timer 318 of FIG. 3) or the occurrence of a particular date (e.g., black Friday). If the item related information does need to be updated [706:YES], then method 700 continues with 710 where a charge level of an energy storage device (e.g., the super capacitor storage element 414 of FIG. 4) is checked. This checking can be performed by a process of the EST (e.g., microcontroller 416 of FIG. 4).

If the charge level is greater than a first threshold level [712:NO], then 714 is performed where the EST updates its item related information (e.g., by communicating with a remote computing device 112 of FIG. 1, storing updated item related information in memory 308 of FIG. 3, and outputting the item related information via output device(s) 316 of FIG. 3). Next, method 300 ends or other processing is performed.

In contrast, if the charge level is equal to or less than the first threshold level [712:YES], then 716 is performed where a request message is communicated from the EST to a neighboring external device. The neighboring external device can include, but is not limited to, another EST, an ESL (e.g., ESL 104$_1$, 104$_2$, 104$_3$ of FIG. 1, a beacon, and/or an access point 128 of FIG. 1). The request message requests that the neighboring external device obtain the updated item related information (e.g., from computing device 112 of FIG. 1) on the EST's behalf.

Next in 718, the EST performs energy harvesting operations. The energy harvesting operations are achieved using an energy harvesting circuit (e.g., energy harvesting circuit 332 of FIG. 3). When the charge level of an energy storage device (e.g., super capacitor storage element 414 of FIG. 4) becomes equal to or greater than a second threshold level [720:YES], then method 700 continues with 722-724 of FIG. 7B. 722-724 involve: performing operations by the EST to obtain the updated item related information from the neighboring external device; and performing operations by the EST to store and output the updated item related information therefrom (e.g., in accordance with method 600 of FIG. 6).

Figure 7C:
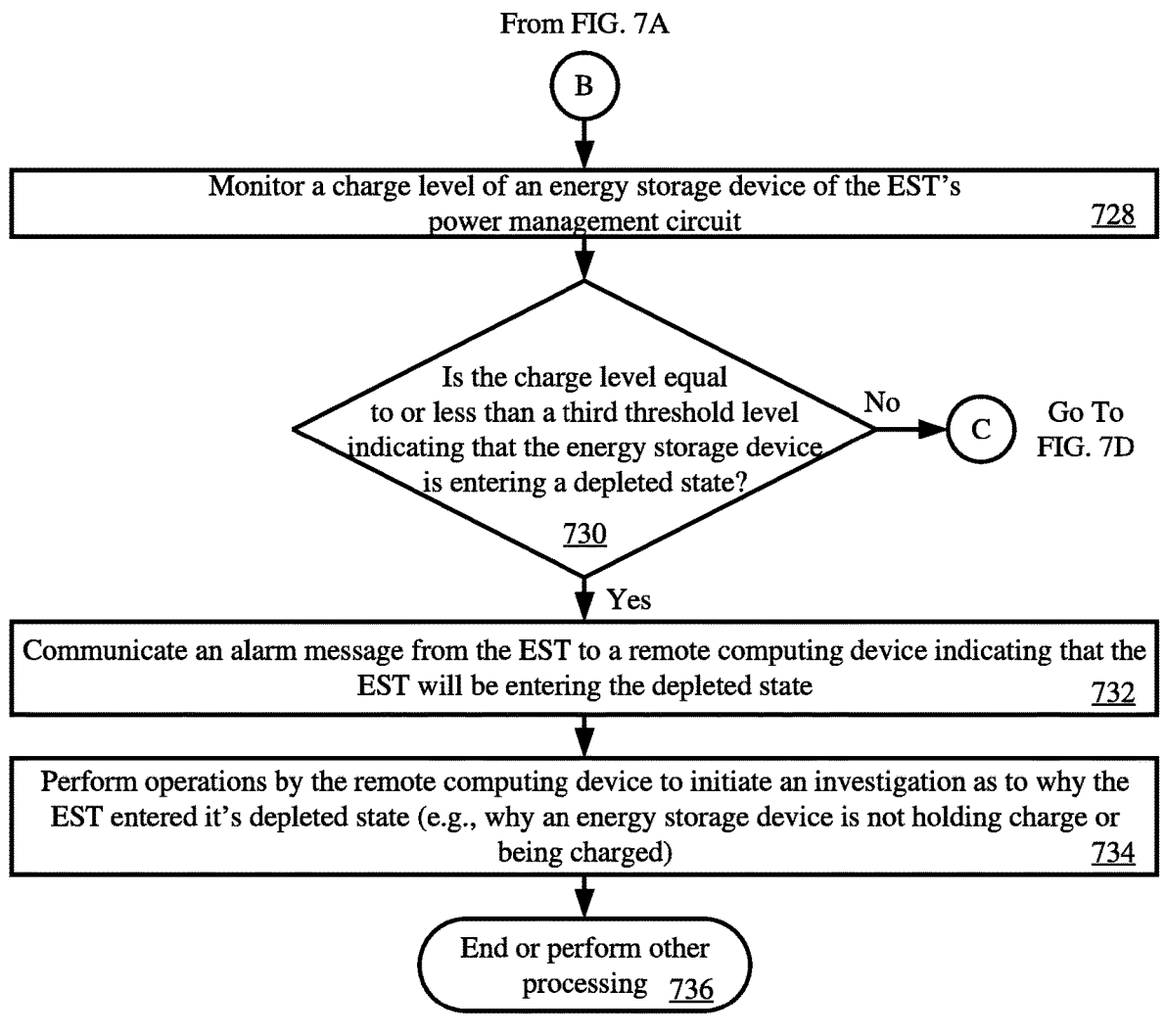

Returning to FIG. 7A, if the item related information does not need to be updated [706:NO], then method 700 continues with 728-736 of FIG. 7C. As shown in FIG. 7C, 728 involves monitoring (e.g., continuously or periodically) a charge level of the energy storage device of the EST's power management circuit (e.g., power management circuit 334 of FIG. 3). If the charge level is equal to or less than a third threshold level [730:YES], then method 700 continues with 732-734. 732-734 involve: communicating an alarm message from the EST to a remote computing device (e.g., computing device 112 of FIG. 1) indicating that the EST will be entering a deleted state; and performing operations by the remote computing device to initiate an investigation as to why the EST entered it's depleted state (e.g., why the energy storage device is not holding charge or is not being charged). Subsequently, 736 is performed where method 700 ends or other processing is performed.

Figure 7D:
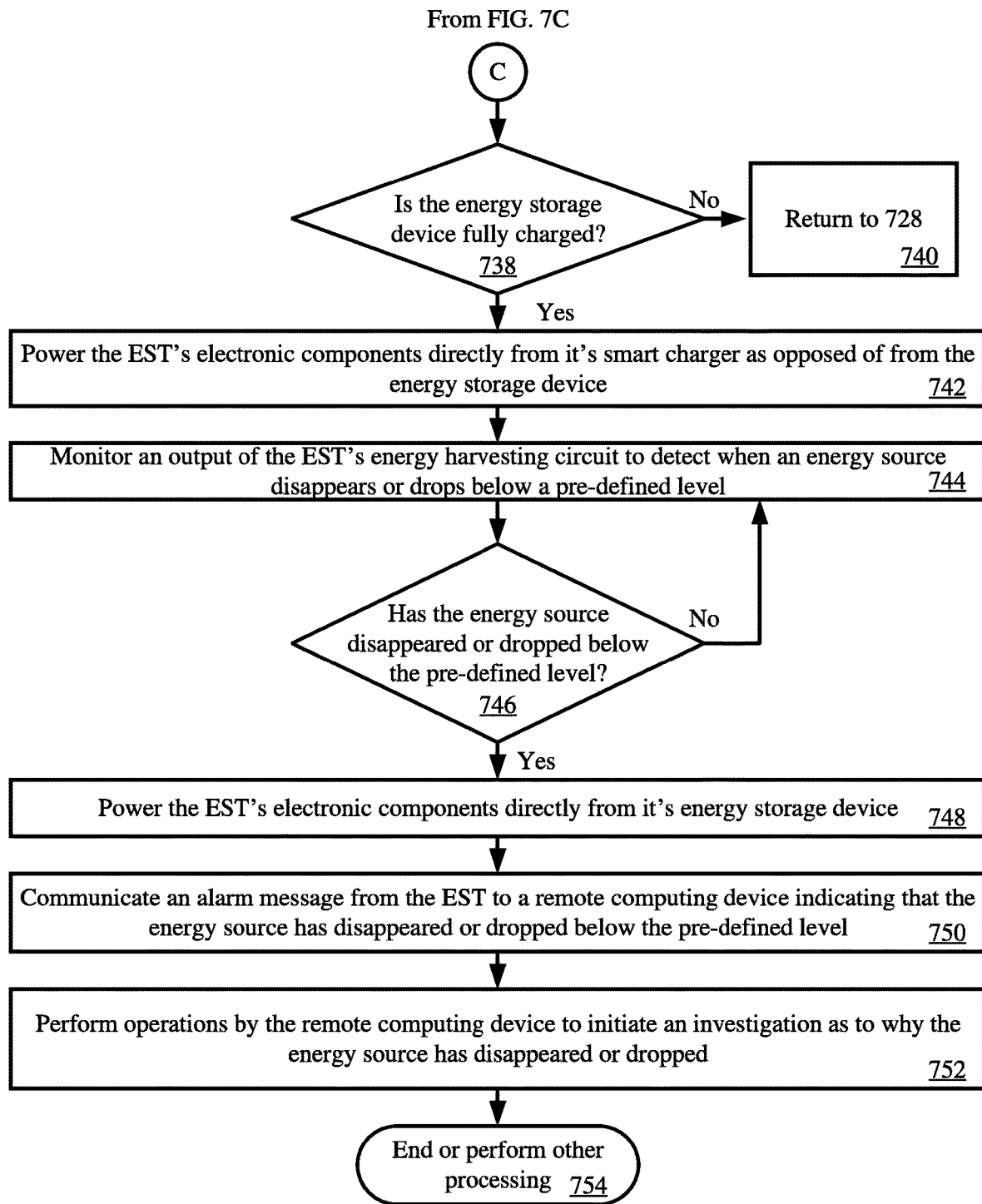

In contrast if the charge level is greater than a third threshold level [730:NO], then method 700 continues with a decision 738 of FIG. 7D. When the energy storage device is fully charged [738:YES], the EST's electronic components (e.g., components 304, 330, 336, 340, 350, 344, and/or 346 of FIG. 3) are powered directly from its smart charger (e.g., smart charger 412 of FIG. 4) as opposed from the energy storage device.

The output of the EST's energy harvesting circuit (e.g., energy harvesting circuit 332 of FIG. 3) is monitored in 744 to detect when an energy source disappears or drops below a pre-defined level. When the energy source has disappeared or dropped below the pre-defined level [746:YES], then the EST's electronic components are powered directly from the energy storage device, as shown by 748. Also, an alarm message is communicated from the EST to a remote computing device (e.g., computing device 112 of FIG. 1) indicating that the energy source has disappeared or dropped below the pre-defined level, as shown by 750. In response to the alarm message, the remote computing device performs operations to initiate an investigation as to why the energy source has disappeared or dropped, as shown by 752. For example, a store employee is notified of this fact and asked to investigate the issue. Additionally or alternatively, an inventory system health check is performed (e.g., to determine if one or more lights has been turned off or inoperative, blocked intentionally by a thief (e.g., such as by placing in a bag), or blocked unintentionally by other merchandise). Subsequently, 754 is performed where method 700 ends or other processing is performed.

Figure 8:
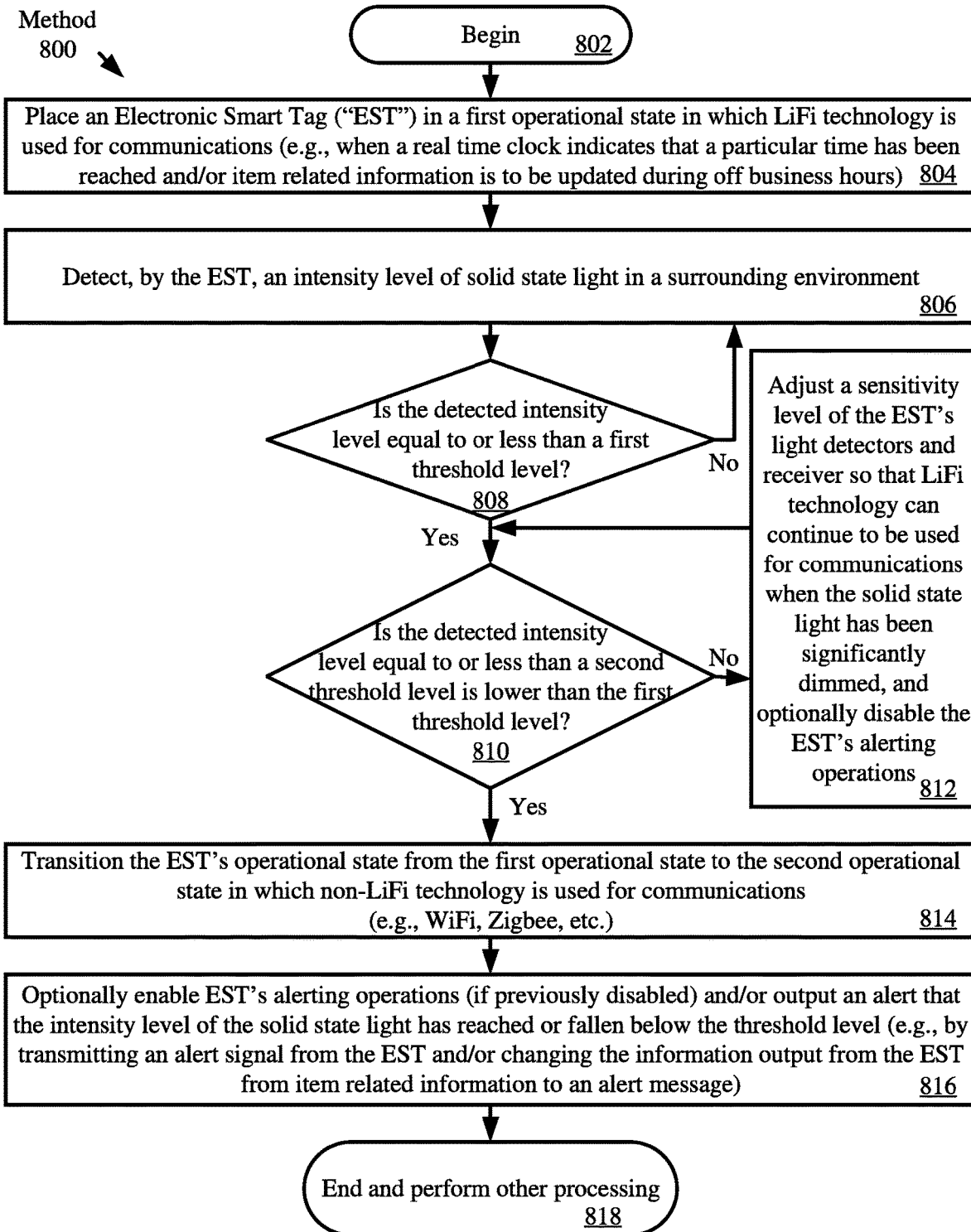
FIG. 8 provides a flow diagram of yet another exemplary method for operating an EST.

Referring now to FIG. 8, there is provided a flow diagram of an exemplary method 800 for operating an EST (e.g. EST 120 of FIG. 1 and/or EST 200 of FIGS. 2-4). Notably, method 800 can be implemented via an ESL instead of or in addition to an EST. A person skilled in the art would appreciate that certain modifications to method 800 would need to be made in this scenario.

As shown in FIG. 8, method 800 begins with 802 and continues with 804 where the EST is placed in a first operational state in which LiFi technology is used for communications. In some scenarios, a controller/processor (e.g., the controller/processor 310 of FIG. 3) sets the EST's operational state when the EST's real time clock (e.g., clock 318 of FIG. 3) indicates that a particular time has been reached and/or item related information is to be updated during off business hours.

Next in 806, the EST detects an intensity level of solid state light in a surrounding environment. This detection can be made using a sensor (e.g., sensor 350 of FIG. 3) provided with the EST. If the detected intensity level is greater than a first threshold level [808:NO], then method 800 returns to 806. In contrast, if the detected intensity level is less than or equal to the first threshold level [808:YES], method 800 continues with 810 where a decision is made as to whether or not the detected intensity level is equal to or less than a second threshold level that is lower than the first threshold level.

If the detected intensity level is greater than the second threshold level [810:NO], 812 is performed where a sensitivity level of the EST's light detector(s) and receiver are adjusted (e.g., by controller/processor 310 of FIG. 3). In this way, the LiFi technology can continue to be used for communications when the solid state light has been significantly dimmed. 812 may also optionally involve disabling the EST's alerting operations (e.g., by controller/processor 310 of FIG. 3) so that alerts are not sent from the EST during off business hours.

In contrast, if the detected intensity level is equal to or less than the second threshold level [810:YES] (e.g., indicating that the solid state light is being disrupted by something preventing the solid state light from reaching the EST), 814 is performed where the EST's operational state is transitioned from the first operational state to the second operational state in which non-LiFi technology is used for communications (e.g., WiFi, Zigbee, etc.). This operational state transition can be performed by a controller/processor of the EST (e.g., by controller/processor 310 of FIG. 3). In 816, the EST's alerting operations may be enabled (e.g., by controller/processor 310 of FIG. 3) if they were previously disabled. Also, an alert may be output from the EST (e.g., via output device 316 of FIG. 3). For example, an alert signal may be transmitted from the EST. Additionally or alternatively, the information being output from the EST is changed from item related information to an alert message. Notably, the operations of 816 are optional since it may not be desirable to output alerts from the EST in some scenarios such as in off business hours. Thus, the operations of 816 may be performed when the EST's clock (e.g., real time clock 318 of FIG. 3) indicates that the current time is during normal business hours (e.g., 9 AM-6 PM) rather than off business hours. Subsequently, 818 is performed where method 800 ends.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for operating an Electronic Smart Tag ("EST") coupled to an item, comprising:
   outputting from the EST item related information specifying at least one characteristic of the item;
   monitoring a charge level of an energy storage device disposed within the EST;
   performing first operations by the EST to obtain updated item related information from a remote computing device via a neighboring external device when the charge level of the energy storage device falls below a threshold level; and
   performing second operations by the EST to obtain the updated item related information from the remote computing device without the assistance of the neighboring external device when the charge level of the energy storage device is above the threshold level.

2. The method according to claim 1, wherein the first operations comprise:
   communicating from the EST a request message requesting that the neighboring external device obtain the updated item related information on the EST's behalf from the remote computing device;
   performing energy harvesting operations by the EST; and
   obtaining the updated item related information from the neighboring external device when the charge level of an energy storage device rises above the threshold level.

3. The method according to claim 1, wherein the characteristic comprises at least one of an item description, item nutrition, an item regular price, an item sale price, a currency symbol, or an item source.

4. The method according to claim 1, further comprising communicating an alarm message from the EST to the remote computing device when the charge level of the energy storage device indicates that the EST is entering a depleted state.

5. The method according to claim 4, further comprising performing operations by the remote computing device to initiate an investigation as to why the EST is entering the depleted state, in response to a reception of the alarm message.

6. An Electronic Smart Tag ("EST") coupled to an item, comprising:
   an output device configured to output item related information specifying at least one characteristic of the item;
   a processor configured to monitor a charge level of an energy storage device disposed within the EST; and
   a communication enabled device configured to
   perform first operations to obtain updated item related information from a remote computing device via a neighboring external device when the charge level of the energy storage device falls below a threshold level, and
   perform second operations to obtain the updated item related information from the remote computing device without the assistance of the neighboring external device when the charge level of the energy storage device is above the threshold level.

7. The EST according to claim 6, wherein the first operations comprise:

communicating from the communication enabled device a request message requesting that the neighboring external device obtain the updated item related information on the EST's behalf from the remote computing device; and obtaining the updated item related information from the neighboring external device when the charge level of the energy storage device rises above the threshold level.

8. The EST according to claim 6, wherein the characteristic comprises at least one of an item description, item nutrition, an item regular price, an item sale price, a currency symbol, or an item source.

9. The EST according to claim 6, wherein the communication enabled device is further configured to communicate an alarm message to the remote computing device when the charge level of the energy storage device indicates that the EST is entering a depleted state.

10. The EST according to claim 9, wherein the remote computing device initiates an investigation as to why the EST is entering the depleted state, in response to a reception of the alarm message.

\* \* \* \* \*